(12) United States Patent
Harders et al.

(10) Patent No.: US 9,150,454 B2
(45) Date of Patent: Oct. 6, 2015

(54) USE OF ORGANOGELATOR MOLECULES IN BITUMINOUS COMPOSITIONS TO IMPROVE THE RESISTANCE OF SAME TO CHEMICAL STRESS

(75) Inventors: Sylvia Harders, Buchholz (DE); Laurence Lapalu, Villeurbanne (FR); Romuald Botel, Feyzin (FR)

(73) Assignee: Total Raffinage Marketing, Puteaux (FR)

( * ) Notice: Subject to any disclaimer, the term of this patent is extended or adjusted under 35 U.S.C. 154(b) by 0 days.

(21) Appl. No.: 13/643,245

(22) PCT Filed: Apr. 29, 2011

(86) PCT No.: PCT/IB2011/051909
§ 371 (c)(1),
(2), (4) Date: Oct. 24, 2012

(87) PCT Pub. No.: WO2011/135550
PCT Pub. Date: Nov. 3, 2011

(65) Prior Publication Data
US 2013/0036941 A1 Feb. 14, 2013

(30) Foreign Application Priority Data
Apr. 30, 2010 (FR) ................................ 10 53390

(51) Int. Cl.
| C08L 95/00 | (2006.01) |
| C04B 26/26 | (2006.01) |
| C04B 103/00 | (2006.01) |
| C04B 111/00 | (2006.01) |
| C04B 111/20 | (2006.01) |

(52) U.S. Cl.
CPC ............... C04B 26/26 (2013.01); C08L 95/00 (2013.01); C04B 2103/0062 (2013.01); C04B 2111/0075 (2013.01); C04B 2111/20 (2013.01); C08L 2555/22 (2013.01); C08L 2555/80 (2013.01)

(58) Field of Classification Search
CPC .. C08L 95/00; C08L 2555/50; C08L 2666/66
USPC ........... 106/281.1, 284.4, 284.06; 524/62, 68, 524/71
See application file for complete search history.

(56) References Cited

U.S. PATENT DOCUMENTS

| 5,888,289 | A | 3/1999 | Hendriks et al. |
| 6,849,581 | B1 * | 2/2005 | Thompson et al. ............ 507/118 |
| 8,188,293 | B2 | 5/2012 | Tournilhac et al. |
| 8,506,699 | B2 * | 8/2013 | Chaverot et al. ............ 106/281.1 |
| 2004/0102547 | A1 | 5/2004 | Cowley et al. |
| 2005/0187317 | A1 | 8/2005 | Cowley et al. |
| 2009/0025607 | A1 | 1/2009 | Koenders et al. |
| 2009/0062551 | A1 | 3/2009 | Tournilhac et al. |
| 2010/0192804 | A1 | 8/2010 | Lapalu et al. |
| 2011/0144242 | A1 | 6/2011 | Chaverot et al. |
| 2012/0214912 | A1 | 8/2012 | Harders et al. |
| 2012/0220700 | A1 | 8/2012 | Harders et al. |
| 2013/0041075 | A1 * | 2/2013 | Harders et al. ............. 106/284.4 |

FOREIGN PATENT DOCUMENTS

| EP | 1572807 B1 | 10/2007 |
| FR | 2849047 B1 | 12/2005 |
| WO | WO-2005105926 A1 | 11/2005 |
| WO | WO 2009/101275 A1 * | 8/2009 |

OTHER PUBLICATIONS

Isare B., et al.; "The weak help the strong: Low-molar-mass organogelators harden bitumen;" Lamgmuir American Chemical Society USA, vol. 25, No. 15, Aug. 4, 2009; pp. 8400-8403.

* cited by examiner

*Primary Examiner* — Helene Klemanski
(74) *Attorney, Agent, or Firm* — Harness, Dickey & Pierce, P.L.C.

(57) ABSTRACT

The use in a bituminous composition of an organogelator molecule of the following general formula (I) is disclosed below:

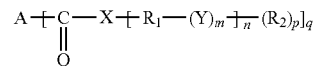

where:
A is a hydrocarbon group which can be straight or branched, saturated or unsaturated, acyclic, cyclic or polycyclic, having 3 to 92 carbon atoms, resulting from the polymerization of lateral chains of at least one unsaturated fatty acid,
X is an NH group or an oxygen atom O,
$R_1$ is a group chosen from: a straight or branched hydrocarbon group with 2 to 40 carbon atoms, optionally including one or more heteroatoms and optionally including one or more unsaturations, or an aromatic group, substituted or otherwise,
$R_2$ is a group selected among: a hydrogen atom, a straight or branched hydrocarbon group with 1 to 40 carbon atoms, including one or more heteroatoms and optionally including one or more unsaturations, or an aromatic group, substituted or otherwise;
m and n are, separately from one another, an integer ranging from 1 to 4,
p is an integer ranging from 0 to 4,
q is an integer ranging from 1 to 4 or a combination of the values,
Y is a group including a hydrogen bond donor such as the NH grouping and a hydrogen bond acceptor such as the C=O grouping, to improve the resistance thereof to aggressive chemical agents, in particular to hydrocarbons such as gasolines, diesels and/or kerosenes.

21 Claims, No Drawings

USE OF ORGANOGELATOR MOLECULES IN BITUMINOUS COMPOSITIONS TO IMPROVE THE RESISTANCE OF SAME TO CHEMICAL STRESS

CROSS-REFERENCE TO RELATED APPLICATIONS

This application is a National Phase Entry of International Application No. PCT/IB2011/051909, filed on Apr. 29, 2011, which claims priority to French Patent Application Serial No. 1053390, filed on Apr. 30, 2010, both of which are incorporated by reference herein.

TECHNICAL FIELD

The present invention relates to the field of bitumens. More specifically, it relates to the use of organogelling molecules in bituminous compositions to improve their resistance to chemical attack.

BACKGROUND

It is known to use bituminous compositions, in particular bitumen/cross-linked polymer compositions, as coatings for various surfaces and, in particular, as road surfacings, provided that these compositions exhibit in combination a certain number of characteristics, in particular mechanical. In order to maintain and/or improve the characteristics and in particular the mechanical properties of a conventional bitumen, bituminous compositions have for a long time been used, in which the bitumen (formed by one or more types of bitumen) is mixed with one or more functional polymers, in particular styrene and butadiene elastomers, these elastomers being optionally chemically cross-linked in situ, optionally using a coupling or cross-linking agent, for example sulphur or at least one of its precursors.

Optimized mechanical characteristics are in particular crucial for road surfacing applications. In addition to the mechanical properties, in the case of bitumens account should be taken of their susceptibility to certain chemical agents. These aggressive chemical agents can be, for example hydrocarbon solvents, in particular petroleum-based solvents such as kerosenes, gas oils and/or gasolines or also products, in particular fluids, used for de-icing and/or defrosting and/or snow removal from aircraft and from taxiing zones. These fluids are for example saline aqueous solutions of potassium, sodium, magnesium and/or calcium, and/or compositions based on ethylene glycol and/or based on propylene glycol. The aggressive effect of such chemical agents builds up with the stresses of intense traffic, in particular of heavy vehicles, and bad weather, which has the detrimental effect of increasing the rapid degradation of carriageways, in particular aircraft runways.

This sensitivity of the bitumens to these aggressive chemical agents, to chemical attack is more particularly problematic for the bitumens constituting for example tarmacs and the surfacings of airport runways, which are made of bituminous mixes (bitumen/aggregates conglomerate). In fact, these airport tarmacs and surfacings are frequently soiled by drips of kerosene during the filling of aircraft tanks, by leaks or other accidental spills of petroleum products. Moreover, they are also exposed to the different fluids used in cold weather to remove ice, frost and/or snow from aircraft and runways.

The surfacings of service stations well as industrial tank farms can also be subject to this same problem of the resistance of the bituminous surfacings to aggressive chemical agents such as hydrocarbon solvents and/or de-icing/defrosting/snow removal fluids. Conventional road carriageways are of course also exposed to this type of chemical attack.

In an attempt to remedy this, it has been proposed to incorporate various additives into bitumens. Thus the patent EP1311619 describes the use of waxes in bitumens in order to increase their resistance to hydrocarbons. The waxes are in particular synthetic waxes resulting from the Fischer Tropsch synthesis process.

In patent application EP1756228 the applicant company proposed incorporating fatty-chain polyamines into the bitumen in order to improve resistance to chemical attack and in particular to hydrocarbons. In patent EP1572807 the applicant company also proposed incorporating into the bitumen, functionalized olefin polymers chosen from the random terpolymers of ethylene, alkyl acrylate or methacrylate and glycidyl acrylate or methacrylate, to improve resistance to petroleum-based solvents. The patent EP0900253 describes the use of ethylene and vinyl acetate copolymers in a bitumen on order to improve resistance to kerosene.

SUMMARY

Continuing its work, the applicant company surprisingly discovered that another type of additive made it possible to increase the resistance of the bituminous compositions to aggressive chemical agents, in particular hydrocarbons, such as gasolines, kerosenes and/or gas oils. Thus the applicant company noticed that the use in a bituminous composition of at least one organogelling molecule of general formula (I) below:

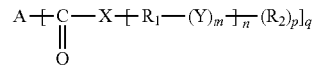

where:
- A represents an acyclic, cyclic or polycyclic, saturated or unsaturated, linear or branched hydrocarbon group, with 3 to 92 carbon atoms, resulting from the polymerization of the side chains of at least one unsaturated fatty acid,
- X represents an NH group or an oxygen atom O,
- $R_1$ represents a group chosen from: a linear or branched hydrocarbon group with 2 to 40 carbon atoms, optionally comprising one or more heteroatoms and optionally comprising one or more unsaturations, or a substituted or unsubstituted aromatic group,
- $R_2$ represents a group chosen from: a hydrogen atom, a linear or branched hydrocarbon group with 1 to 40 carbon atoms, comprising one or more heteroatoms and optionally comprising one or more unsaturations, or a substituted or unsubstituted aromatic group,
- m and n represent independently of each other an integer varying from 1 to 4,
- p represents an integer varying from 0 to 4,
- q represents an integer varying from 1 to 4 or a combination of these values,
- Y represents a group comprising a hydrogen bond donor such as the NH group and a hydrogen bond acceptor such as the C=O group, made it possible to increase the resistance of the bituminous compositions to chemical attack such as that caused by the hydrocarbons such as gasolines, kerosenes and/or gas oils or by de-icing/defrosting/snow removal products.

The bituminous compositions comprising such additives are known as such in the applicant company's application WO2009101275. The applicant company has now discovered a novel use for the compositions.

BRIEF DESCRIPTION

The invention relates to the use of at least one organogelling molecule in a bituminous composition in order to improve the resistance of said bituminous composition to aggressive chemical agents, said organogelling molecule being represented by general formula (I):

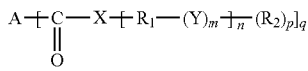

where:
- A represents an acyclic, cyclic or polycyclic, saturated or unsaturated, linear or branched hydrocarbon group, with 3 to 92 carbon atoms, resulting from the polymerization of the side chains of at least one unsaturated fatty acid,
- X represents an NH group or an oxygen atom O,
- $R_1$ represents a group chosen from: a linear or branched hydrocarbon group with 2 to 40 carbon atoms, optionally comprising one or more heteroatoms and optionally comprising one or more unsaturations, or a substituted or unsubstituted aromatic group,
- $R_2$ represents a group chosen from: a hydrogen atom, a linear or branched hydrocarbon group with 1 to 40 carbon atoms, comprising one or more heteroatoms and optionally comprising one or more unsaturations, or a substituted or unsubstituted aromatic group,
- m and n represent independently of each other an integer varying from 1 to 4,
- p represents an integer varying from 0 to 4,
- q represents an integer varying from 1 to 4 or a combination of these values,
- Y represents a group comprising a hydrogen bond donor such as the NH group and a hydrogen bond acceptor such as the C=O group.

Preferably, Y represents a group chosen from the urea —NHCONH—, amide —NHCO—, urethane —OCONH— or urea groups of general formula (II):

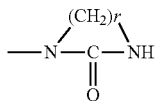

with r an integer having a value of 2 or 3 and p having a value of 0 and n having a value of 1. Preferably, the unsaturated fatty acids are unsaturated fatty acids with 4 to 24 carbon atoms ($C_4$ to $C_{24}$), preferably with 11 to 22 carbon atoms ($C_{11}$ to $C_{22}$), preferably with 16 to 18 carbon atoms ($C_{16}$ to $C_{18}$). Preferably, the unsaturated fatty acids are $C_{18}$ unsaturated fatty acids with 18 carbon atoms, in particular chosen from oleic acid, linoleic acid, linolenic acid alone or in a mixture.

Preferably, the organogelling molecule of general formula (I) is in the form of a mixture of more than 70% fatty acid derivative of general formula (I) with q=2 and/or q=3. Preferably, the $R_1$ and/or $R_2$ group represents an aromatic group substituted by alkyl groups and/or alkoxy groups.

Preferably, Y represents an urea —NHCONH— group, preferably with n having a value of 1, m and p having a value of 1 or m and p having a value of 2. Preferably, Y represents a urea group of general formula (II):

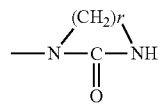

with r an integer having a value of 2 or 3, p having a value of 0 and n having a value of 1, preferably with m having a value of 1, preferably with X representing an NH group. Preferably, Y represents an amide —CONH— group, preferably with m and p having a value of 1, preferably with X representing an NH group. Preferably, Y represents an urethane —OCONH— group, preferably with m, n and p having a value of 1, preferably with X representing an NH group.

Preferably, the bituminous composition comprises from 0.1 to 30% by mass of organogelling molecule of general formula (I), preferably from 0.5 to 20%, preferably from 1 to 10%, preferably from 2 to 5%. Preferably, the bituminous composition also comprises at least one polymer. Preferably, the polymer is a monovinylaromatic hydrocarbon and conjugated diene copolymer, preferably styrene and butadiene copolymer.

Preferably, the monovinylaromatic hydrocarbon and conjugated diene copolymer has a content of 1,2 double bond units originating from the conjugated diene, comprised between 5% and 50% by mass with respect to the total mass of the conjugated diene units, preferably between 10% and 40%, more preferably between 15% and 30%, even more preferably between 20% and 25%, even more preferably between 18% and 23%. Preferably, the bituminous composition comprises a cross-linking agent.

Preferably, the aggressive chemical agents are hydrocarbons, in particular petroleum hydrocarbons, such as kerosenes, gasolines and/or gas oils. Preferably, the aggressive chemical agents are products used for de-icing, de-frosting and/or snow removal, such as saline solutions and/or compositions based on ethylene glycol and/or based on propylene glycol. Preferably, it is a question of improving the resistance to aggressive chemical agents of the bituminous composition when the latter is used in road applications as a surface layer. Preferably, it is a question of improving the resistance to aggressive chemical agents of the bituminous composition when the latter is in a mixture with aggregates in a bituminous mix.

DETAILED DESCRIPTION

The organogelling molecules used according to the invention are represented by general formula (I) below:

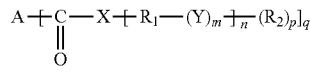

where:
- A represents an acyclic, cyclic or polycyclic, saturated or unsaturated, linear or branched hydrocarbon group, with 3 to 92 carbon atoms, resulting from the polymerization of the side chains of at least one unsaturated fatty acid,
- X represents an NH group or an oxygen atom O,
- $R_1$ represents a group chosen from: a linear or branched hydrocarbon group with 2 to 40 carbon atoms, optionally comprising one or more heteroatoms and optionally comprising one or more unsaturations, or a substituted or unsubstituted aromatic group, $R_2$ represents a group chosen from: a hydrogen atom, a linear or branched hydrocarbon group with 1 to 40 carbon atoms, comprising one or more heteroatoms and optionally comprising one or more unsaturations, or a substituted or unsubstituted aromatic group, m and n represent independently of each other an integer varying from 1 to 4, p represents an integer varying from 0 to 4, q represents an integer varying from 1 to 4 or a combination of these values, Y represents a group comprising a hydrogen bond donor such as the NH group and a hydrogen bond acceptor such as the C=O group.

The A group according to the invention results from the polymerization of the side chains of at least one unsaturated fatty acid. The unsaturated fatty acids used are unsaturated fatty acids with 4 to 24 carbon atoms ($C_4$ to $C_{24}$), preferably with 11 to 22 carbon atoms ($C_{11}$ to $C_{22}$), preferably with 16 to 18 carbon atoms ($C_{16}$ to $C_{18}$).

Among the unsaturated fatty acids used, there can be mentioned for example, crotonic acid ($C_4$), iso-crotonic acid ($C_4$), undecylenic acid ($C_{11}$), hypogeic acid ($C_{16}$), palmitoleic acid ($C_{16}$), oleic acid ($C_{18}$), elaidic acid ($C_{18}$), vaccenic acid ($C_{18}$), petroselinic acid ($C_{18}$), gadoleic acid ($C_{20}$), gondoic acid ($C_{20}$), cetoleic acid ($C_{22}$), erucidic acid ($C_{22}$), brassidic acid ($C_{22}$), nervonic acid ($C_{24}$), tiglic acid ($C_5$), sorbic acid ($C_6$), linoleic acid ($C_{18}$), hiragonic acid ($C_{16}$), linolenic acid ($C_{18}$), γ-linolenic acid ($C_{18}$), eleostearic acid ($C_{18}$), parinaric acid ($C_{18}$), homo-γ-linolenic acid ($C_{20}$), arachidonic acid ($C_{20}$), clupanodonic acid ($C_{22}$) alone or in mixtures. Preferably, the unsaturated fatty acids are $C_{18}$ unsaturated fatty acids with 18 carbon atoms, in particular chosen from oleic acid, linoleic acid, linolenic acid alone or in a mixture.

It is also possible to polymerize the acids originating from TOFA or Tall Oil Fatty Acid (rich in oleic acids and linoleic acids) and polymerize the fatty acids that it contains. It is possible to polymerize a mixture containing the same fatty acid or a mixture containing several different fatty acids. The reaction making it possible to polymerize the chains of the fatty acids is a Diels-Alder reaction (for more information see Kirk Othmer Encyclopedia of Chemical Technology, Vol 7, p. 768 or "The dimer acids", Humko Sheffield, 1975).

The polymerization reaction is a dimerization, trimerization or tetramerization reaction in which fatty acid dimers (or diacid dimers), fatty acid trimers (or triacid trimers) or fatty acid tetramers (or tetracid tetramers) are respectively obtained. Traces of unreacted fatty acids can also be present. Depending on the experimental conditions used, a mixture is therefore obtained containing unreacted fatty acids (A-$(COOH)_q$ with q=1), or fatty acid dimers (A-$(COOH)_q$ with q=2), or fatty acid trimers (A-$(COOH)_q$ with q=3), or fatty acid tetramers (A-$(COOH)_q$ with q=4) at different concentrations, A having the meaning given previously.

The organogelling molecules of general formula (I) obtained by this polymerization reaction are therefore in the form of a mixture in which the derivatives of fatty acids of general formula (I) coexist, where the integer q has a value of 1, 2, 3 and/or 4. The reaction product comprises predominantly fatty acid dimers (q=2) and fatty acid trimers (q=3), unreacted fatty acids (q=1) or fatty acid tetramers (q=4) being minority products.

According to a preferred embodiment, the organogelling molecules of general formula (I) are therefore in the form of a mixture of more than 70% fatty acid derivative of general formula (I) with q=2 and/or q=3, i.e. the polymerization reaction leads to more than 70% of a mixture of fatty acid dimers and/or fatty acid trimers. More preferably, the derivatives of fatty acids of general formula (I) are in the form of a mixture of more than 80% of derivatives of fatty acids of general formula (I) with q=2 and/or q=3. The reaction products are in the form of (linear or branched) acyclic compounds, cyclic compounds or polycyclic (in particular bicyclic) compounds.

When unreacted fatty acids (A-$(COOH)_q$ with q=1) remain, the A group is a linear acyclic hydrocarbon group, with 3 to 23 carbon atoms ($C_4$ to $C_{24}$ fatty acids), preferably with 15 to 21 carbon atoms ($C_{16}$ to $C_{22}$ fatty acids), preferably with 17 to 19 carbon atoms ($C_{18}$ to $C_{20}$ fatty acids). In the case of the fatty acid dimers, the fatty acid trimers and the fatty acid tetramers, the A group is a branched acyclic or cyclic or polycyclic hydrocarbon group. In the case of the fatty acid dimers, the A group is a branched acyclic or cyclic or polycyclic hydrocarbon group with 6 to 46 carbon atoms ($C_4$ to $C_{24}$ fatty acid dimers), preferably with 30 to 42 carbon atoms ($C_{16}$ to $C_{22}$ fatty acid dimers), preferably with 34 to 38 carbon atoms ($C_{18}$ to $C_{20}$ fatty acid dimers).

In the case of the fatty acid trimers, the A group is a branched acyclic or cyclic or polycyclic hydrocarbon group with 9 to 69 carbon atoms ($C_4$ to $C_{24}$ fatty acid trimers), preferably with 45 to 63 carbon atoms ($C_{16}$ to $C_{22}$ fatty acid trimers), preferably with 51 to 57 carbon atoms ($C_{18}$ to $C_{20}$ fatty acid trimers). For the fatty acid tetramers, the A group is a branched acyclic or cyclic or polycyclic hydrocarbon group with 12 to 92 carbon atoms ($C_4$ to $C_{24}$ fatty acid tetramers), preferably with 60 to 84 carbon atoms ($C_{16}$ to $C_{22}$ fatty acid tetramers), preferably with 68 to 76 carbon atoms ($C_{18}$ to $C_{20}$ fatty acid tetramers). The A group is a saturated group when the polymerization reaction is followed by a selective hydrogenation reaction of the double bonds.

By way of example, starting from linoleic acid, or oleic acid or Tall Oil Fatty Acid, comprising predominantly $C_{18}$ fatty acids with 18 carbon atoms, it is possible to obtain a mixture comprising the following acid dimers (A-$(COOH)_q$ with q=2):

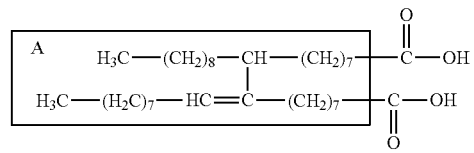

acyclic compound cyclic compound bicyclic compound

The above three A-(COOH)₂ compounds have two acid functions and the A group according to the invention.

In the above example, the A group can be presented in three forms:
- in the acyclic compound, A is an unsaturated, branched hydrocarbon group with 34 carbon atoms,
- in the cyclic compound, A is an unsaturated, cyclic, hydrocarbon group with 34 carbon atoms,
- in the bicyclic compound, A is an unsaturated, polycyclic, hydrocarbon group with 34 carbon atoms.

The organogelling molecule is therefore in the form of a mixture with respect to the integer q (mixture of fatty acid dimers and/or of fatty acid trimers for example) and also in the different chemical forms that a fatty acid dimer can assume (mixture of cyclic or bicyclic compounds for example).

Among the commercially available polymerized fatty acids, there can be mentioned PRIPOL® marketed by Unichema, POLYMERGIN® products marketed by HARBURGER BRINCKMAN & MERGELL GmbH, DIMER® products marketed by Westvaco, and EMPOL® products marketed by Cognis. For example, EMPOL 1008® comprises 3.5% unreacted $C_{18}$ fatty acid (q=1), 92.3% $C_{36}$ fatty acid dimer (q=2) and 3.5% $C_{54}$ fatty acid trimer (q=3). Furthermore, in EMPOL 1008®, the double bonds are completely hydrogenated.

For example, EMPOL 1018® comprises 4% unreacted fatty acid (q=1), 79% fatty acid dimer (q=2) and 17% fatty acid trimer (q=3). For example, EMPOL 1040® comprises 20% $C_{36}$ fatty acid dimer (q=2) and 80% $C_{54}$ fatty acid trimer (q=3). For example, EMPOL 1041® comprises 10% $C_{36}$ fatty acid dimer (q=2) and 90% $C_{54}$ fatty acid trimer (q=3). For example, EMPOL 1054® comprises 4% unreacted $C_{18}$ fatty acid in (q=1), 55% $C_{36}$ fatty acid dimer (q=2) and 35% $C_{54}$ fatty acid trimer (q=3). For example, PRIPOL 1045® comprises 10% $C_{36}$ fatty acid dimer (q=2) and 90% $C_{54}$ fatty acid trimer (q=3).

The A groups, due to their dissymmetry and their irregularity of structure exhibit little or even no crystallinity. Furthermore, due to the presence of the numerous alkyl chains, they have a low glass transition temperature Tg (close to 20° C. or below 20° C.). This low glass transition temperature gives the molecules (I) a degree of flexibility, they are capable of deforming without breaking. The combination of the A units and the hydrogen bonds contributed by the Y units makes it possible for the molecules (I) to be deformable, but return to their initial state (elasticity) after elongation.

The Y group of the organogelling molecules of general formula (I) comprises at least one hydrogen bond donor group and at least one hydrogen bond acceptor group which can form hydrogen bonds. The hydrogen bond donor is for example an NH group and the hydrogen bond acceptor is for example the C═O carbonyl group. The NH and C═O functions are found in particular in the urea, amide or urethane groups. The Y group is therefore chosen from the urea —NHCONH—, amide —NHCO—, urethane —OCNH— or urea groups of general formula (II):

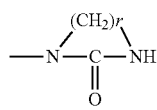

with r being an integer having a value of 2 or 3 and p having a value of 0.

The urea —NHCONH—, amide —NHCO—, urethane —OCNH— or urea groups of general formula (II) of the Y group make it possible for the organogelling molecules of general formula (I) to combine with each other via a network of hydrogen bonds. At the temperatures of use (between −20° C. and +60° C.) the combination of the organogelling molecules of general formula (I) confers upon the bitumen improved properties in terms of hardness and elasticity.

When the bituminous composition is heated to application temperatures (between +90° C. and +180° C.) the interactions between the organogelling molecules of general formula (I) disappear and the bitumen assumes the properties of a non-cross-linked bitumen, the viscosity of the bituminous composition when hot returns to that of the starting bitumen. Thus, when the organogelling molecules (I) according to the invention are added to a bitumen, bituminous compositions are obtained which are reversibly, and more particularly thermoreversibly, cross-linked.

By thermoreversible cross-linking of the bituminous compositions according to the invention, is meant cross-linking which results in the following phenomena:
- at a low temperature, for example at temperatures of use, the organogelling molecules (I) are combined with each other via a network of hydrogen bonds obtained by means of the Y units. The supramolecular network formed confers upon the bituminous composition good mechanical properties in particular in terms of hardness and elasticity.
- at a high temperature, for example at application temperatures, an increase in temperature causes the network of hydrogen bonds to break and as a result the dissociation of the supramolecular network. The closeness of the organogelling molecules (I) disappears and the bituminous composition returns to a low viscosity and therefore a good fluidity.
- a reduction in temperature and a return to temperatures of use allow the network of hydrogen bonds to reform. The phenomenon is thermoreversible.

The applicant company has now discovered that the use of the organogelling molecules of general formula (I) also made it possible to obtain bituminous compositions more resistant to chemical attack, in particular to chemical attack caused by petroleum-based solvents such as kerosenes, gas oils and/or gasolines or also products, in particular fluids, used for de-icing and/or de-frosting and/or snow removal. The $R_1$ and $R_2$ groups represent independently of each other a linear or branched hydrocarbon group respectively with 2 or 1 carbon atoms to 40 carbon atoms, optionally comprising one or more heteroatoms and optionally comprising one or more unsaturations, or a substituted or unsubstituted aromatic group. As the $R_2$ group is at the end of the chain it can moreover represent a hydrogen atom, which is not the case for $R_1$.

Preferably the $R_1$ and/or $R_2$ groups are unsaturated linear groups, preferably with 2 to 24 carbon atoms, preferably with 5 to 18 carbon atoms, more preferably with 6 to 12 carbon atoms. Preferably the $R_1$ and/or $R_2$ groups are unsubstituted aromatic groups. When $R_1$ and/or $R_2$ represents a substituted aromatic groups, the aromatic group is substituted by alkyl groups, preferably methyl, ethyl, propyl, butyl groups and/or substituted by alkoxy groups, preferably methoxy, ethoxy, propoxy, butoxy groups. When $R_1$ and/or $R_2$ comprise one or more heteroatoms, the heteroatoms are preferably nitrogen atoms, more preferably $R_1$ and/or $R_2$ comprise a single nitrogen atom.

In a particular embodiment, the Y group represents an urea —NHCONH— group and general formula (I) is written as follows (Ia):

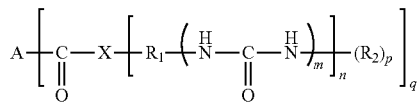

where the A, $R_1$, $R_2$ groups and the integers m, n, p and q have the same meaning as previously.

Preferably, the integers m, n and p have a value of 1, preferably X represents an NH group, the molecules corresponding to following formula ($Ia_1$) are used:

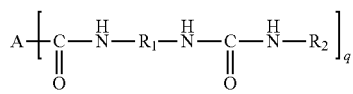

where the A, $R_1$, $R_2$ groups and the integer q have the same meaning as previously.

In particular, the molecules ($Ia_1$) of the following table are used:

| Molecule ($Ia_1$) | $R_1$ | $R_2$ |
|---|---|---|
| ![mol1] | $(CH_2)_6$ | phenyl |
| ![mol2] | phenyl | $(CH_2)_{11}-CH_3$ |
| ![mol3] | $(CH_2)_6$ | $(CH_2)_7-CH_3$ |

The molecules ($Ia_1$) are synthesized from a commercial mixture resulting from the polymerization of fatty acids of general formula (III) A-$[COOH]_q$, the A group and the integer q have the same meaning as previously. The acid function(s) of the compound of general formula (III) react first with a diamine of formula (IV) $H_2N-R_1-NH_2$. The remaining amine functions then react with an isocyanate of general formula (V) $O=C=N-R_2$, the $R_1$ and $R_2$ groups have the same meaning as previously.

Preferably, the integers m, n and p have a value of 1, preferably X represents an oxygen atom O, and the molecules corresponding to the following formula ($Ia_2$) are used:

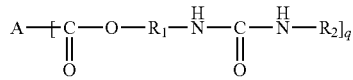

where the A, $R_1$, $R_2$ groups and the integer q have the same meaning as previously.

In particular, the molecules ($Ia_2$) of the following table are used:

| Molecule ($Ia_2$) | $R_1$ | $R_2$ |
|---|---|---|
| ![mol4] | $(CH_2)_2$ | H |
| ![mol5] | $(CH_2)_6$ | phenyl |

The molecules ($Ia_2$) are synthesized from a commercial mixture resulting from the polymerization of fatty acids of general formula (III) A-$[COOH]_q$, the A group and the integer q have the same meaning as previously. The acid function(s) of the compound of general formula (III) are first activated in acyl chloride to form A-$[COCl]_q$ which then reacts with a compound of formula (VI) HO—$R_1$—NHCONH—$R_2$, the $R_1$ and $R_2$ groups have the same meaning as previously.

Preferably, the integer n has a value of 1, preferably the integers m and p have a value of 2, preferably X represents an NH group, the molecules corresponding to the following formula ($Ia_3$) are used:

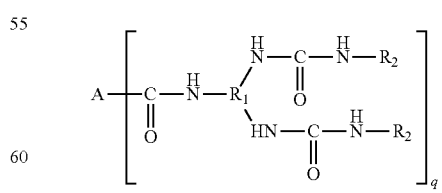

where the A, $R_1$, $R_2$ groups and the integer q have the same meaning as previously.

In particular, the molecules ($Ia_3$) of the following table are used:

| Molecule (Ia₃) | | $R_1$ | $R_2$ |
|---|---|---|---|
| 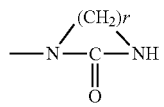 | | $((CH_2)_2)_3$—N | phenyl |
| 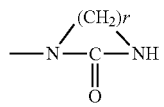 | | $((CH_2)_2)_3$—N | $(CH_2)_7$—$CH_3$ |

The molecules (Ia₃) are synthesized from a commercial mixture resulting from the polymerization of fatty acids of general formula (III) A-[COOH]$_q$, the A group and the integer q have the same meaning as previously. The acid function(s) of the compound of general formula (III) react first with a triamine of formula (VII) (H₂N)₃—R₁. The remaining amine functions then react with an isocyanate of general formula (V) O=C=N—R₂, R₁ and R₂ have the same meaning as previously.

In a second particular embodiment, the Y group represents a urea group of formula (II):

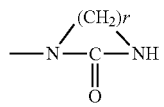

where r is an integer having a value of 2 or 3. In this embodiment, p has a value of 0 and n has a value of 1, general formula (I) is written as follows (Ib):

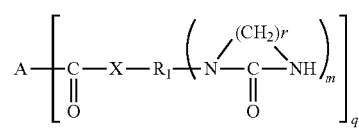

where the A and R₁ groups and the integers m and q have the same meaning as previously.

Preferably, the integer m has a value of 1, preferably X represents an NH group and general formula (Ib) is written as follows (Ib₁):

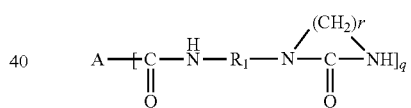

where the A and R₁ groups and the integer q have the same meaning as previously.

In particular, the molecules (Ib₁) of the following table are used:

| Molecule (Ib₁) | $R_1$ | r |
|---|---|---|
| 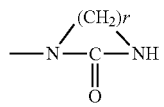 | $(CH_2)_2$ | 2 |
| 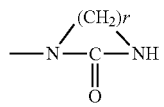 | $(CH_2)_2$—NH—$(CH_2)_2$ | 2 |

The preparation of the molecules (Ib$_1$) is described in the application WO2006087475.

Among the preferred molecules of the sub-family (Ib$_1$), there can be mentioned the following molecule (Ib$_1$-1), in which A is a saturated cyclic hydrocarbon group with 32 carbon atoms which results from the dimerization of fatty acids rich in linoleic acid:

The molecules (Ic$_1$) are synthesized from a commercial mixture resulting from the polymerization of fatty acids of general formula (III) A-[COOH]$_q$, the A group and the integer q have the same meaning as previously. The acid function(s) of the compound of general formula (III) react with a compound of formula (VIII) H$_2$N—(R$_1$—CONH)$_n$—R$_2$, the R$_1$ and R$_2$ groups and the integer n have the same meaning as previously.

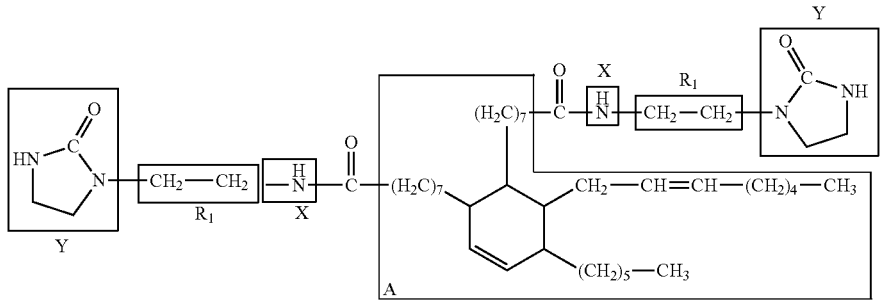
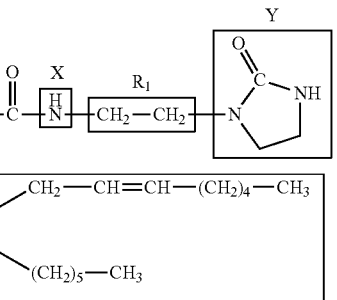

In a third particular embodiment, the Y group represents an amide —CONH— group, and general formula (I) is written as follows (Ic):

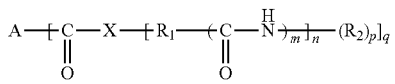

where the A, R$_1$, R$_2$ groups and the integers m, n, p and q have the same meaning as previously.

Preferably, the integers m and p have a value of 1, preferably X represents an NH group and general formula (Ic) is written as follows (Ic$_1$):

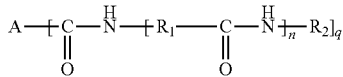

where the A, R$_1$, R$_2$ groups and the integers n and q have the same meaning as previously.

In particular, the molecules (Ic$_1$) of the following table are used:

In a last particular embodiment, the Y group represents a urethane —OCONH— group and general formula (I) is written as follows (Id):

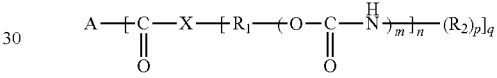

where the A, R$_1$, R$_2$ groups and the integers m, n, p and q have the same meaning as previously.

Preferably, the integers m, n and p have a value of 1, preferably X represents an NH group and the molecules corresponding to the following formula (Id$_1$) are used:

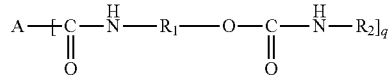

where the A, R$_1$, R$_2$ groups and the integer q have the same meaning as previously.

In particular, the molecules (Id$_1$) of the following table are used:

| Molecule (Ic$_1$) | n | R$_1$ | R$_2$ |
|---|---|---|---|
| ![A-[C(=O)-N(H)-((CH$_2$)$_5$-C(=O)-N(H))$_2$-(CH$_2$)$_{11}$-CH$_3$]$_q$] | 2 | (CH$_2$)$_5$ | (CH$_2$)$_{11}$—CH$_3$ |
| ![A-[C(=O)-N(H)-((CH$_2$)$_{10}$-C(=O)-N(H))$_4$-phenyl]$_q$] | 4 | (CH$_2$)$_{10}$ | phenyl |

| Molecule (Id$_1$) | R$_1$ | R$_2$ |
|---|---|---|
| 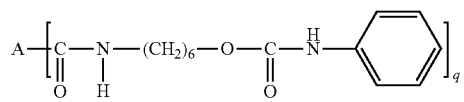 | (CH$_2$)$_6$ | phenyl |
| 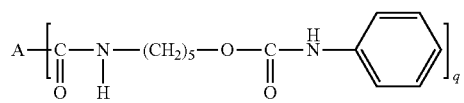 | (CH$_2$)$_5$ | phenyl |
| 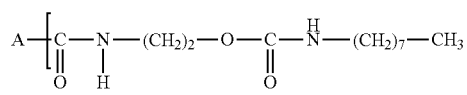 | (CH$_2$)$_2$ | (CH$_2$)$_7$—CH$_3$ |

The molecules (Id$_1$) are synthesized from a commercial mixture resulting from the polymerization of fatty acids of general formula (III) A-[COOH]$_q$, the A group and the integer q have the same meaning as previously. The acid function(s) of the compound of general formula (III) react first with a compound of formula (IX) H$_2$N—R$_1$—OH. The remaining alcohol functions then react with an isocyanate of general formula (V) O=C=N—R$_2$, the R$_1$ and R$_2$ groups have the same meaning as previously.

According to the invention, it is possible to combine the different preferred embodiments and to have for example molecules of formula (Ia) in a mixture with molecules of formula (Ib) or in a mixture with molecules of formula (Ic), or in a mixture with molecules of formula (Id). Still according to the invention, the chemical synthesis of the molecules of general formula (I), is sometimes accompanied by by-products but it is not necessary to separate the products of general formula (I), from the reaction by-products, products which are in the minority. From 0.1 to 30% by mass of organogelling molecule of general formula (I) alone or in a mixture, is used in the bituminous composition. Preferably from 0.5 to 20%, preferably from 1 to 10%, preferably from 2 to 5%.

The bitumen used can be a bitumen obtained from different origins. The bitumen which can be used according to the invention can be chosen from the bitumens of natural origin, such as those contained in deposits of natural bitumen, natural asphalt or bituminous sands. The bitumen which can be used according to the invention can also be a bitumen or a mixture of bitumens originating from the refining of crude oil such as bitumens from direct distillation or bitumens from distillation under reduced pressure or also blown or semi-blown bitumens, residues from deasphalting with propane or pentane, visbreaking residues, these different cuts being able to be used alone or in a mixture. The bitumens used can also be bitumens fluxed by adding volatile solvents, fluxes of petroleum origin, carbochemical fluxes and/or fluxes of vegetable origin. It is also possible to use synthetic bitumens also called clear, pigmentable or colourable bitumens, i.e. mixtures of oil and resin, said oil and/or resin being of petroleum and/or vegetable origin. The bitumen can be a bitumen of naphthenic or paraffinic origin, or a mixture of these two bitumens.

The bituminous composition can also comprise at least one polymer. The polymers which can be used according to the invention are the polymers which can be used in a standard fashion in the field of bitumens such as for example the polybutadienes, polyisoprenes, butyl rubbers, polyacrylates, polymethacrylates, polychloroprenes, polynorbornenes, polybutenes, polyisobutenes, polyethylenes, ethylene and vinyl acetate copolymers, ethylene and methyl acrylate copolymers, ethylene and butyl acrylate copolymers, ethylene and maleic anhydride copolymers, ethylene and glycidyl methacrylate copolymers, ethylene and glycidyl acrylate copolymers, ethylene and propene copolymers, ethylene/propene/diene (EPDM) terpolymers, acrylonitrile/butadiene/styrene (ABS) terpolymers, ethylene/alkyl acrylate or methacrylate/glycidyl acrylate or methacrylate terpolymers and in particular ethylene/methyl acrylate/glycidyl methacrylate terpolymer and ethylene/alkyl acrylate or methacrylate/maleic anhydride terpolymers and in particular ethylene/butyl acrylate/maleic anhydride terpolymer.

The preferred polymers are copolymers based on conjugated diene units and monovinylaromatic hydrocarbon units, which can in particular be cross-linked. The conjugated diene is preferably chosen from those comprising 4 to 8 carbon atoms, such as 1,3 butadiene (butadiene), 2-methyl-1,3-butadiene (isoprene), 2,3-dimethyl-1,3-butadiene, 1,3-pentadiene, 1,2-hexadiene, chloroprene, carboxylated butadiene and/or carboxylated isoprene. Preferably, the conjugated diene is butadiene. The monovinylaromatic hydrocarbon is preferably chosen from styrene, o-methyl styrene, p-methyl styrene, p-tert-butylstyrene, 2,3 dimethyl-styrene, α-methyl styrene, vinyl naphthalene, vinyl toluene and/or vinyl xylene. Preferably, the monovinyl hydrocarbon is styrene.

More particularly, the copolymer consists of one or more copolymers chosen from the monovinylaromatic hydrocarbon and conjugated diene copolymers, in particular styrene and butadiene copolymers. These monovinylaromatic hydrocarbon and conjugated diene copolymers, in particular styrene and butadiene copolymers, can be linear or star-shaped. They can be in diblock, triblock and/or multibranched form. These monovinylaromatic hydrocarbon and conjugated diene copolymers, in particular styrene and butadiene copolymers, optionally comprise a random hinge.

Preferably the copolymer is an monovinylaromatic hydrocarbon and conjugated diene diblock copolymer, in particular a styrene and butadiene diblock copolymer, in particular a styrene and butadiene diblock copolymer having a random hinge. The monovinylaromatic hydrocarbon and conjugated diene copolymer, in particular styrene and butadiene copolymer, has an average molecular mass M$_W$ comprised between 4,000 and 500,000 daltons, preferably between 10,000 and 200,000, more preferably between 50,000 and 150,000, even more preferably between 80,000 and 130,000, even more preferably between 100,000 and 120,000. The molecular mass of the copolymer is measured by GPC chromatography (Gel permeation chromatography) with a polystyrene standard according to the standard ASTM D3536 (replaced by the standard ASTM D5296-05).

The monovinylaromatic hydrocarbon and conjugated diene copolymer, in particular styrene and butadiene copolymer, advantageously has a content by weight of monovinylaromatic hydrocarbon, in particular of styrene ranging from 5% to 50% by mass with respect to the mass of copolymer, preferably from 20% to 40%. The monovinylaromatic hydrocarbon and conjugated diene copolymer, in particular styrene and butadiene copolymer, advantageously has a content by weight of conjugated diene, in particular in butadiene, ranging from 50% to 95% by mass with respect to the mass of copolymer, preferably from 60% to 80%.

Among the conjugated diene units, a distinction is drawn between the 1,4 double bond units originating from the conjugated diene and the 1,2 double bond units originating from the conjugated diene. By 1,4 double bond units originating from the conjugated diene, is meant the units obtained via a 1,4 addition during the polymerization of the conjugated diene. By 1,2 double bond units originating from the conjugated diene, is meant the units obtained via a 1,2 addition during the polymerization of the conjugated diene. The result of this 1,2 addition is a so-called "pendant" vinyl double bond.

The monovinylaromatic hydrocarbon and conjugated diene copolymer, in particular styrene and butadiene copolymer, has a content of 1,2 double bond units originating from the conjugated diene, in particular originating from the butadiene, comprised between 5% and 50% by mass with respect to the total mass of the conjugated diene, in particular butadiene units, preferably between 10% and 40%, more preferably between 15% and 30%, even more preferably between 20% and 25%, even more preferably between 18% and 23%. The monovinylaromatic hydrocarbon and conjugated diene copolymer, in particular styrene and butadiene copolymer, having a content of 1,2 double bond units originating from the conjugated diene, in particular originating from the butadiene as defined above can be used with or without a cross-linking agent, as it has the property of being "self cross-linking", the copolymer branches are cross-linked, linked to each other via these so-called "pendant" vinyl double bonds, without necessarily having to resort to the use of a cross-linking agent. The bituminous composition comprises from 1% to 20% by mass of polymer, in particular monovinylaromatic hydrocarbon and conjugated diene copolymer, in particular styrene and butadiene copolymer, with respect to the mass of the bituminous composition, preferably from 2% to 10%, even more preferably from 3% to 5%.

The cross-linking of the polymer, in particular of the monovinylaromatic hydrocarbon and conjugated diene copolymer, in particular styrene and butadiene copolymer, in the bituminous composition, is achieved by means of the use of a polymer, in particular an monovinylaromatic hydrocarbon and conjugated diene copolymer, in particular a styrene and butadiene copolymer, as defined above and a cross-linking agent, or by means of the use of a polymer, in particular a monovinylaromatic hydrocarbon and conjugated diene copolymer, in particular styrene and butadiene copolymer, having a particular quantity of 1,2 double bond units originating from the conjugated diene, in particular butadiene, this quantity of 1,2 double bond units originating from the conjugated diene, in particular butadiene, being comprised between 5% and 50% by mass with respect to the total mass of the conjugated diene, in particular butadiene, units preferably between 10% and 40%, more preferably between 15% and 30%, even more preferably between 20% and 25%, even more preferably between 18% and 23%, or also by means of the use of said polymer, in particular the monovinylaromatic hydrocarbon and conjugated diene copolymer, in particular styrene and butadiene copolymer, having the particular quantity of 1,2 double bond units originating from the conjugated diene, in particular from the butadiene, in combination with a cross-linking agent.

Preferably, the cross-linking agent is chosen from sulphur and the hydrocarbyl polysulphides, alone or in a mixture, optionally in the presence of sulphur-donor or non-sulphur-donor vulcanization accelerators, alone or in a mixture. The sulphur is in particular flowers of sulphur or also alpha crystallized sulphur.

The hydrocarbyl polysulphides are for example chosen from the dihexyl disulphides, dioctyl disulphides, didodecyl disulphides, di-tertdodecyl disulphides, dihexadecyl disulphides, dihexyl trisulphides, dioctyl trisulphides, dinonyl trisulphides, di-tertdodecyl trisulphides, dihexadecyl trisulphides, diphenyl trisulphides, dibenzyl trisulphides, dihexyl tetrasulphides, dioctyl tetrasulphides, dinonyl tetrasulphides, di-tertdodecyl tetrasulphides, dihexadecyl tetrasulphides, diphenyl tetrasulphides, orthotolyl tetrasulphides, dibenzyl tetrasulphides, dihexyl pentasulphides, dioctyl pentasulphides, dinonyl pentasulphides, di-tertdodecyl pentasulphides, dihexadecyl pentasulphides, dibenzyl pentasulphides and diallyl pentasulphides. The sulphur-donor vulcanization accelerators can be chosen from the thiuram polysulphides, such as for example, tetrabutylthiuram disulphides, tetraethylthiuram disulphides and tetramethylthiuram disulphides, dipentamethylenethiuram disulphides, dipentamethylenethiuram tetrasulphides or dipentamethylenethiuram hexasulphides.

The non-sulphur-donor vulcanization accelerators which can be used according to the invention can be chosen in particular from mercaptobenzothiazole and its derivatives, dithiocarbamates and their derivatives, and thiuram monosulphides and their derivatives, alone or in a mixture. There may be mentioned as examples of non-sulphur-donor vulcanization accelerators, zinc 2-mercaptobenzothiazole, zinc benzothiazolethiolate, sodium benzothiazolethiolate, benzothiazyl disulphide, copper benzothiazolethiolate, benzothiazyl N,N'-diethyl thiocarbamyl sulphide and benzothiazole sulphenamides such as 2-benzothiazole diethyl sulphenamide, 2-benzothiazole pentamethylene sulphenamide, 2-benzothiazole cyclohexyl sulphenamide, N-oxydiethylene 2-benzothiazole sulphenamide, N-oxydiethylene 2-benzothiazole thiosulphenamide, 2-benzothiazole dicyclohexyl sulphenamide, 2-benzothiazole diisopropyl sulphenamide, 2-benzothiazole tertbutyl sulphenamide, bismuth dimethyldithiocarbamate, cadmium diamyldithiocarbamate, cadmium diethyldithiocarbamate, copper dimethyldithiocarbamate, lead diamyldithiocarbamate, lead dimethyldithiocarbamate, lead pentamethylenedithiocarbamate, selenium dimethyldithiocarbamate, tellurium diethyldithiocarbamate, zinc diamyldithiocarbamate, zinc dibenzyldithiocarbamate, zinc diethyldithiocarbamate, zinc dimethyldithiocarbamate, zinc dibutyldithiocarbamate, zinc pentamethylenedithiocarbamate, dipentamethylenethiuram monosulphide, tetrabutylthiuram monosulphide, tetraethylthiuram monosulphide and tetramethylthiuram monosulphide.

The cross-linking agent can also be chosen from the compounds of general formula HS—R—SH where R represents a saturated or unsaturated, linear or branched hydrocarbon group with 2 to 40 carbon atoms, optionally comprising one or more heteroatoms, such as oxygen. Among the compounds corresponding to this general formula, there can be mentioned for example, 1,2 ethanedithiol, 1,3 propanedithiol, 1,4 butanedithiol, 1,5 pentanedithiol, 1,6 hexanedithiol, 1,7 heptanedithiol, 1,8 octanedithiol, bis-(2-mercaptoethyl)ether, bis-(3-mercaptoethyl)ether, bis-(4-mercaptoethyl)ether, (2-mercaptoethyl) (3-mercaptobutyl)ether, (2-mercaptoethyl) (4-mercaptobutyl)ether, 1,8-dimercapto-3,6-dioxaoctane, benzene-1,2-dithiol, benzene-1,3-dithiol, benzene-1,4-dithiol or toluene-3,4-dithiol, biphenyl-4,4'-dithiol.

In general a quantity of cross-linking agent between 0.05% and 5% by mass with respect to the mass of the bituminous composition, preferably between 0.1% and 2%, more preferably between 0.2% and 1%, even more preferably between 0.3% and 0.5% is used. Preferably, the quantities of polymer and cross-linking agent are fixed so as to obtain a polymer/cross-linking agent (or styrene and butadiene copolymer/cross-linking agent) ratio comprised between 50:1 and 150:1, preferably between 60:1 and 100:1, more preferably between 70:1 and 80:1.

The cross-linking of the bituminous compositions can be demonstrated by carrying out tensile tests according to the standard NF EN 13587 on these bituminous compositions. The cross-linked bituminous compositions have a higher tensile strength than the non-cross-linked bituminous compositions. A higher tensile strength results in a high ultimate elongation or maximum elongation ($\epsilon$ max in %), a high rupture stress or maximum elongation stress ($\sigma\epsilon$ max in MPa), high conventional energy at 400% (E 400% in $J/cm^2$) and/or high total energy (total E in J).

The bituminous compositions, in particular the cross-linked bitumen/polymer compositions, have a maximum elongation, according to the standard NF EN 13587, greater than or equal to 400%, preferably greater than or equal to 500%, more preferably greater than or equal to 600%, even more preferably greater than or equal to 700%. The bituminous compositions, in particular the cross-linked bitumen/polymer compositions, have a maximum elongation stress, according to the standard NF EN 13587, greater than or equal to 0.4 MPa, preferably greater than or equal to 0.6 MPa, more preferably greater than or equal to 0.8 MPa, even more preferably greater than or equal to 1.2 MPa.

The bituminous compositions, in particular the cross-linked bitumen/polymer compositions, have a conventional energy at 400%, according to the standard NF EN 13587, greater than or equal to 3 $J/cm^2$, preferably greater than or equal to 5 $J/cm^2$, more preferably greater than or equal to 10 $J/cm^2$, even more preferably greater than or equal to 15 $J/cm^2$. The bituminous compositions, in particular the cross-linked bitumen/polymer compositions, have a total energy according to the standard NF EN 13587, greater than or equal to 1 J, preferably greater than or equal to 2 J, more preferably greater than or equal to 4 J, even more preferably greater than or equal to 5 J.

The bituminous composition can also optionally comprise adhesiveness additives and/or surfactants. They are chosen from the alkyl amine derivatives, alkyl polyamine derivatives, alkyl amidopolyamine derivatives, alkyl amidopolyamine derivatives and quaternary ammonium salt derivatives, alone or in a mixture. The most used are the tallow propylene-diamines, tallow amido-amines, quaternary ammoniums obtained by quaternization of tallow propylene-diamines, tallow propylene-polyamines. The quantity of adhesiveness additives and/or surfactants in the bituminous composition is comprised between 0.1% and 2% by mass with respect to the mass of the bituminous composition, preferably between 0.2% and 1%. The bituminous composition can also optionally comprise at least one oil chosen from the oils of petroleum origin, vegetable origin and/or animal origin.

The bituminous composition is prepared by mixing the organogelling molecule of general formula (I) with the bituminous composition at a temperature of 100° C. to 220° C., preferably 120° C. to 200° C., more preferably 140° C. to 180° C., even more preferably between 160° C. and 170° C., for a duration of 30 minutes to 48 hours, preferably 1 hour to 24 hours, more preferably 2 hours to 16 hours, even more preferably 4 hours to 8 hours. The different additional additives described above, such as the polymers or the oils can be added before or after the organogelling molecule under the same temperature and duration conditions. When a cross-linked bitumen/polymer composition is prepared, first of all the cross-linked bitumen/polymer composition is prepared without the organogelling molecule of general formula (I), by mixing the bitumen, the polymer, in particular the monovinylaromatic hydrocarbon and conjugated diene copolymer, in particular the styrene and butadiene copolymer, and optionally the cross-linking agent at a temperature of 100° C. to 220° C., preferably 120° C. to 200° C., more preferably 140° C. to 180° C., even more preferably between 160° C. and 170° C., for a duration of 1 hour to 48 hours, preferably 4 hours to 24 hours, more preferably 8 hours to 16 hours.

When the bitumen/polymer composition is cross-linked, the organogelling molecule of general formula (I) is then added to the cross-linked bitumen/polymer composition at a temperature of 100° C. to 220° C., preferably 120° C. to 200° C., more preferably 140° C. to 180° C., even more preferably between 160° C. and 170° C., for a duration of 30 minutes to 48 hours, preferably 1 hour to 24 hours, more preferably 2 hours to 16 hours, even more preferably 4 hours to 8 hours. The bituminous compositions comprising the organogelling molecule of general formula (I) are essentially intended to produce bituminous mixes or surface dressings for road applications.

In the case of the bituminous mixes, the bituminous compositions comprising the organogelling molecule of general formula (I) are mixed with aggregates in order to provide bituminous mixes which are resistant to chemical attack, in particular resistant to hydrocarbons. The quantity of bituminous composition comprising the organogelling molecule of general formula (I) in the bituminous mix is comprised between 1 and 10% by mass with respect to the mass of bituminous mix, preferably between 2 and 8%, more preferably between 3 and 5%, the remainder being constituted by the aggregates.

The bituminous mixes are used as a surface layer in zones where the surface can come into contact with aggressive chemical agents such as petroleum hydrocarbons or de-icing, defrosting and/or snow removal products, for example, by way of run-offs. Such surfaces include for example car parks, airport tarmacs and runways, service stations, roundabouts, tank farms. The organogelling molecule of general formula (I) is used to improve the resistance of the bituminous compositions to chemical attack caused by hydrocarbons, in particular petroleum hydrocarbons such as gasolines, fuels, premium fuels, kerosenes, jet fuels, gas oils, diesels.

Similarly the organogelling molecule of general formula (I) is used to improve the resistance of the bituminous compositions to chemical attack caused by de-icing, de-frosting and/or snow removal products such as aqueous saline solutions of potassium, sodium, magnesium and/or calcium, and/or compositions based on ethylene glycol and/or based on propylene glycol. The organogelling molecule of general formula (I) is particularly effective in improving the resistance of the bituminous compositions to hydrocarbons, in particular petroleum hydrocarbons such as the gasolines, kerosenes and/or gas oils.

EXAMPLES

The resistance of the bituminous compositions to hydrocarbons is evaluated according to an internal method similar to the method used to measure the Ring and Ball temperature of bitumens (EN 1427). The rings filled with bituminous compositions are placed in the supports usually used in the EN 1427 method, 5 g balls are placed on these supports. The supports are placed in a beaker filled with kerosene, instead of the water usually used in the standard EN 1427 method. The resistance of the bituminous compositions to the kerosene is evaluated at ambient temperature and under stirring. The duration, softening time of the two bituminous disks until each ball, covered with bituminous compositions, moves downwards by (25.0±0.4) mm is evaluated. The problem arises of the dissolution of the bituminous compositions in kerosene. The liquid in the beaker then becomes opaque, and it is impossible to know visually when the balls drop. We carried out an inspection by taking the supports out at regular time intervals.

Different bituminous compositions are prepared from:
bitumen of penetrability equal to 50 1/10 mm and with a Ring and Ball temperature equal to 51.8° C.,
styrene and butadiene diblock copolymer comprising 25% by mass of styrene with respect to the mass of the copolymer, and 12% 1,2 double bond units originating from the butadiene with respect to the mass of butadiene and a molecular mass $M_w$ of 128000 daltons,
flowers of sulphur,
organogelling molecules of formula (I) described below.

Bituminous Composition $T_1$ (Control)
This is the pure bitumen described above.

Bituminous Composition $T_2$ (Control)
This is a control bituminous composition in which the polymer is irreversibly cross-linked. 95% by mass of the bitumen described above and 5% by mass of the SB block copolymer described above are introduced into a reactor under stirring and at 195° C. The mixture is stirred and heated at 195° C. for approximately 3 hours. Then 0.1% by mass of sulphur is added. The mixture is stirred and heated at 195° C. for 1 hour.

Bituminous Compositions $C_1$ and $C_2$ According to the Invention

Two bituminous compositions according to the invention with two organogelling molecules of general formula (I) are prepared.

1) For the composition $C_1$, the molecule ($Ib_1$-2) is used, the formula of which is as follows:

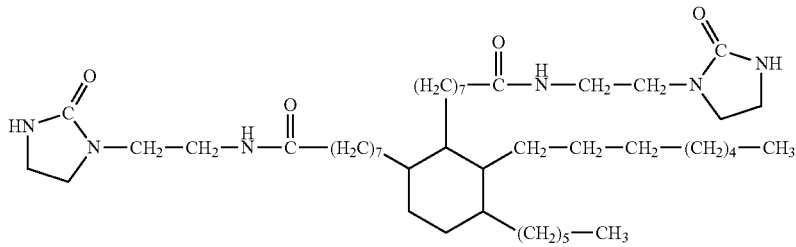

The molecule ($Ib_1$-2) is prepared as described in the application WO2006087475 (pages 12 to 14). The concentration of molecule ($Ib_1$-2) in the composition $C_1$ is 2% by mass.

2) For the composition $C_2$, the molecule ($Id_1$-1) is used, the formula of which is as follows

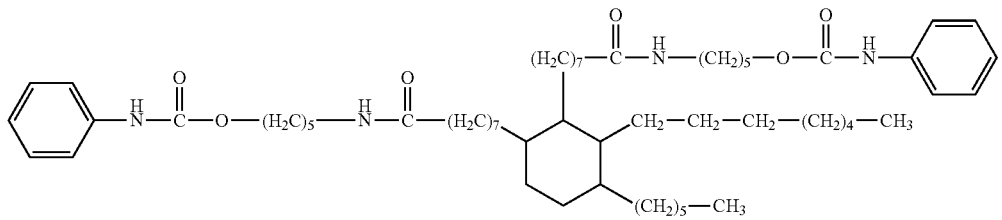

The molecule ($Id_1$-1) is prepared as follows:
51.5 g of EMPOL 1008® (92.3% of $C_{36}$ fatty acid dimer, q=2, completely hydrogenated) and 19 g of 5-amino-1-pentanol are mixed in a reactor then heated at 160° C. for 24 hours. After cooling down to 50° C., 70 mL of chloroform, 1 mL of triethylamine, then 20 mL of phenylisocyanate are added. The medium is stirred at reflux for 24 hours, then the solvent is evaporated off.

The concentration of molecule ($Id_1$-1) in the composition $C_5$ is 5% by mass. The bituminous compositions according to the invention $C_1$ and $C_2$ are prepared as follows:
The bitumen and the molecule of general formula (I) are introduced into a reactor under stirring at 170° C. The mixture is stirred and heated at 170° C. for approximately 2 hours.

The table below shows the physical characteristics of the bituminous compositions according to the invention and of the control bituminous compositions.

| | $T_1$ | $T_2$ | $C_1$ | $C_2$ |
|---|---|---|---|---|
| Penetrability (0.1 mm) [1] | 46 | 43 | 45 | 42 |
| RBT (° C) [2] | 50.2 | 61.6 | 53.7 | 59 |
| Viscosity at 80° C. (Pa · s) | 28.4 | 59.0 | 31.5 | 39.9 |
| Viscosity at 100° C. (Pa · s) | 5.3 | 14.9 | 7.6 | 8.0 |
| Viscosity at 120° C. (Pa · s) | 1.3 | 4.3 | 1.8 | 1.9 |
| Viscosity at 140° C. (Pa · s) | 0.5 | 1.5 | 1.6 | 0.8 |
| Viscosity at 160° C. (Pa · s) | 0.2 | 0.6 | 0.5 | 0.3 |
| Viscosity at 180° C. (Pa · s) | 0.1 | 0.4 | 0.2 | 0.2 |
| Viscosity at 200° C. (Pa · s) | 0.1 | 0.2 | 0.2 | 0.1 |
| Max. elongation at 5° C. (%) [3] | 38 | 697 | 100 | 322 |
| Conventional energy at 400% elongation (J/cm²) [3] | 0 | 17.5 | 0 | 3.7 |
| Time (hours) [4] | 0.5 | 1.5 | 4 | 4 |

[1] According to the standard NF EN 1426.
[2] Ring and Ball temperature, according to the standard NF EN1427.
[3] Tensile test at 5° C., according to standard NF EN 13587, with a stretching rate of 500 mm/min.
[4] Internal method similar to the method used to measure the Ring and Ball temperature of the bitumens (EN 1427) as defined above.

It is also noted that the use of an organogelling molecule of general formula (I) makes it possible to significantly improve the resistance of the bituminous compositions to kerosene. Thus the compositions with additives $C_1$ and $C_2$ resist for 4 hours in the kerosene bath whereas the control compositions $T_1$ and $T_2$ resist for only 30 minutes and 1 hour and 30 minutes respectively.

The invention claimed is:

1. A method for improving resistance of a bituminous composition to petroleum hydrocarbons, the method comprising adding at least one organogelling molecule into a bituminous composition and contacting the bituminous composition containing the organogelling molecule with petroleum hydrocarbons, the at least one organogelling molecule being represented by general formula (I):

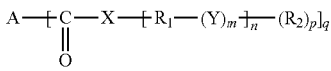

where:
- A represents an acyclic, cyclic or polycyclic, saturated or unsaturated, linear or branched hydrocarbon group, with 3 to 92 carbon atoms, resulting from the polymerization of the side chains of at least one unsaturated fatty acid;
- X represents an NH group or an oxygen atom O;
- $R_1$ is selected from the group consisting of: a linear or branched hydrocarbon group with 2 to 40 carbon atoms, a linear or branched hydrocarbon group with 2 to 40 carbon atoms comprising one or more heteroatoms, a linear or branched hydrocarbon group with 2 to 40 carbon atoms comprising one or more unsaturations, and a substituted or unsubstituted aromatic group;
- $R_2$ is selected from the group consisting of: a hydrogen atom, a linear or branched hydrocarbon group with 1 to 40 carbon atoms comprising one or more heteroatoms, and a linear or branched hydrocarbon group with 1 to 40 carbon atoms comprising one or more heteroatoms and one or more unsaturations, and a substituted or unsubstituted aromatic group;
- m and n represent independently of each other an integer varying from 1 to 4;
- p represents an integer varying from 0 to 4;
- q represents an integer varying from 1 to 4 or a combination of these values; and
- Y represents a group comprising a hydrogen bond donor and a hydrogen bond acceptor.

2. The method according to claim 1 wherein Y is selected from the group consisting of the urea —NHCONH—, amide —NHCO—, urethane —OCONH— and urea groups of general formula (II):

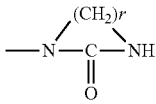

wherein r represents an integer having a value of 2 or 3 and p having a value of 0 and n having a value of 1.

3. The method according to claim 1 wherein the unsaturated fatty acids are unsaturated fatty acids with 4 to 24 carbon atoms ($C_4$ to $C_{24}$).

4. The method according to claim 1 wherein the unsaturated fatty acids are $C_{18}$ unsaturated fatty acids with 18 carbon atoms.

5. The method according to claim 1 wherein the organogelling molecule of general formula (I) is in the form of a mixture of more than 70% fatty acid derivative of general formula (I) with q=2 and/or q=3.

6. The method according to claim 1 wherein the $R_1$ and/or $R_2$ group represents an aromatic group substituted by alkyl groups and/or alkoxy groups.

7. The method according to claim 1 wherein Y represents a urea —NHCONH— group, n has a value of 1, m and p have a value of 1 or m and p have a value of 2.

8. The method according to claim 2 wherein Y represents a urea group of general formula (II):

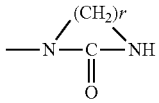

wherein r represents an integer having a value of 2 or 3, p has a value of 0 and n has a value of 1, m has a value of 1, and X representing an NH group.

9. The method according to claim 1 wherein Y represents an amide —CONH— group, m and p have a value of 1, and X is an NH group.

10. The method according to claim 1 wherein Y represents a urethane —OCONH— group, m, n and p have a value of 1, and X is an NH group.

11. The method according to claim 1 wherein the bituminous composition comprises from 0.1 to 30% by mass of organogelling molecule of general formula (I).

12. The method according to claim 1 wherein the bituminous composition also comprises at least one polymer.

13. The method according to claim 12 wherein the polymer is an aromatic monovinyl hydrocarbon and conjugated diene copolymer.

14. The method according to claim 13 wherein the aromatic monovinyl hydrocarbon and conjugated diene copolymer has a content of 1,2 double bond units originating from the conjugated diene comprised between 5% and 50% by mass with respect to the total mass of the conjugated diene units.

15. The method according to claim 12 wherein the bituminous composition comprises a cross-linking agent.

16. The method according to claim 1 further comprising utilizing the bituminous composition in road applications as a surface layer.

17. The method according to claim 1 further comprising mixing aggregates with the bituminous composition and forming a bituminous mix.

18. The method according to claim 12 wherein the polymer is a styrene and butadiene copolymer.

19. The method according to claim 1 wherein the hydrogen bond donor of the Y group is a NH group and the hydrogen bond acceptor is a C=O group.

20. The method according to claim 4 wherein the unsaturated fatty acids with 18 carbon atoms is selected from the group consisting of oleic acid, linoleic acid, and linolenic acid, alone or in a mixture.

21. The method according to claim 1, wherein the petroleum hydrocarbons are gasolines, kerosenes, gas oils, or combinations thereof.

* * * * *